(12) United States Patent
Irani

(10) Patent No.: US 8,679,304 B2
(45) Date of Patent: Mar. 25, 2014

(54) APPARATUS FOR CREATING BIOACTIVE SOLUTION

(76) Inventor: Firdose Irani, Hallandale, FL (US)

( * ) Notice: Subject to any disclaimer, the term of this patent is extended or adjusted under 35 U.S.C. 154(b) by 703 days.

(21) Appl. No.: 12/547,948

(22) Filed: Aug. 26, 2009

(65) Prior Publication Data

US 2010/0116688 A1    May 13, 2010

Related U.S. Application Data

(60) Provisional application No. 61/091,765, filed on Aug. 26, 2008, provisional application No. 61/236,197, filed on Aug. 24, 2009.

(51) Int. Cl.
*C02F 1/461* (2006.01)

(52) U.S. Cl.
USPC .................. 204/252; 204/263; 204/275.1

(58) Field of Classification Search
USPC .................. 204/252, 263, 275.1
See application file for complete search history.

(56) References Cited

U.S. PATENT DOCUMENTS

| | | | |
|---|---|---|---|
| 5,082,544 A * | 1/1992 | Willey et al. ............. | 204/270 |
| 6,090,285 A | 7/2000 | Chau | |
| 6,632,347 B1 * | 10/2003 | Buckley et al. ............ | 205/620 |
| 6,652,719 B1 * | 11/2003 | Tseng ........................ | 204/257 |
| 2002/0036134 A1 * | 3/2002 | Shirota et al. ............. | 204/263 |
| 2005/0121334 A1 * | 6/2005 | Sumita ...................... | 205/628 |
| 2006/0076248 A1 * | 4/2006 | Kindred .................... | 205/743 |
| 2009/0071883 A1 | 3/2009 | Gomez | |

* cited by examiner

*Primary Examiner* — Arun S Phasge
(74) *Attorney, Agent, or Firm* — Robert M. Schwartz

(57) ABSTRACT

A biocide solution containing hypochlorous acid, hydrochlorous acid, hydrochloric acid, percholoric acid, chlorine gas, hydrogen peroxide and ozone provides broad spectrum biocidal properties as well as an apparatus for producing the solution.

9 Claims, 2 Drawing Sheets

APPARATUS FOR CREATING BIOACTIVE SOLUTION

INDEX TO RELATED APPLICATIONS

This application claims the benefit of U.S. Provisional Application No. 61/091,765 filed Aug. 26, 2008 and U.S. Provisional Patent Application No. 61/236,197, filed Aug. 24, 2009, the disclosures of which are incorporated herein by reference in their entirety.

BACKGROUND OF THE INVENTION

Water purification is an essential part of water distribution in every municipality in our country, as well as throughout the world. Deadly microbes colonize bodies of water by the billions and make said water unfit for human use.

Many mechanisms have been conceptualized and produced to purify our waters. These include, but are not limited to: chemicals such as chlorine, UV rays, ozone, etc. . . . The applications of such disinfectants are used, not only by our local governments, but commercially as well. Consumers buy products for use in pools, bathing purposes, laundry, surface cleaning and disinfection, etc. . . . This is a multi-billion dollar industry that is expanding as our knowledge of microbes increases. Unfortunately, there are too few products that are both effective and safe to use. Many of the most effective cleaning agents and disinfectants leave a toxic residue behind. These toxins enter our bodies through our mouths, nasal passageways, and pores.

BRIEF SUMMARY OF THE INVENTION

The invention presented herein involves an electro-chemical process that converts plain water and salt to produce a powerful, yet safe disinfectant. This disinfectant contains five active and powerful ingredients: Hydrogen Peroxide, Ozone, Chlorine, Hypochlorite, and Oxygen. This disinfectant instantly kills: *Listeria, E. coli, Salmonella, Staphylococcus Aureus, Pseudomonas* and mold.

Chlorine is typically an oxidizing agent, as are Hydrogen peroxide and Ozone. Hydrogen peroxide and Ozone in high concentrations have shown to be toxic to many forms of microbial life. During the electrochemical process, the chemical reactions taking place in the machine form different free radicals and/or molecules that contain at least one unpaired electron. The free radicals and molecules containing at least one unpaired electron are different forms of all the Anolyte/Catholyte composition compound. Electrically charged radicals, such as those found in the Anolyte/Catholyte products, have shown to be toxic to many forms of microbial life.

The above electro-chemical process involves electrolysis used to disassociate NaCl and water. The products of this process are uniquely separated within the electrolytic cell using cationic and anionic semipermeable membranes sequentially arranged. Operating parameters for said membranes are above Standard Temperature with Pressure being atmospheric. Ventilation prevents the apparatus from overheating. Thus, as the products of the electrically motivated redox reactions are produced, they are collected as separate fluids and discharged from the machine through two separate ports. Each fluid can be generically called anolyte and catholyte. Each fluid is a mixture or "cocktail" of charged metastable and stable chemical species. Thus, hypochlorite in its charged form is created and collected. Once the fluids are discharged from the machine, chemical reactions within each fluid continue as the metastable break into stable molecules and reactive ions and ionic compounds react with the environment and other fluid components.

The electro-chemical process involved in manufacturing the disinfectant follows:

$$2H_2O + 2NaCl \dashrightarrow 2OH^{--} + H_2 + Cl_2 + 2Na^+$$

$$6H_2O + 2NaOH \dashrightarrow 2H_2 + O_2 + 4H^+ + 4OH^{--} + 2NaOH$$

$$H_2 + Cl_2 \dashrightarrow 2HCl$$

$$2Na + O_2 \dashrightarrow Na_2O_2$$

$$Na_2O_2 + 2HCl \dashrightarrow 2NaCl + H_2O_2$$

$$Cl_2 + 2NaOH \dashrightarrow NaClO + NaCl + H_2O$$

$$2ClO_2 + 2NaOH \dashrightarrow NaClO_2 + NaClO_3 + H_2O$$

$$3OCl^{--} \dashrightarrow ClO_3^{--} + 2Cl^-$$

Process of producing Ozone in the electro-chemical process is not shown above. Electro-chemical process for the production of Ozone follows:

$$O_2 + O^- \dashrightarrow O_3^{--}$$

DETAILED DESCRIPTION OF THE PREFERRED EMBODIMENTS

Figure 1:
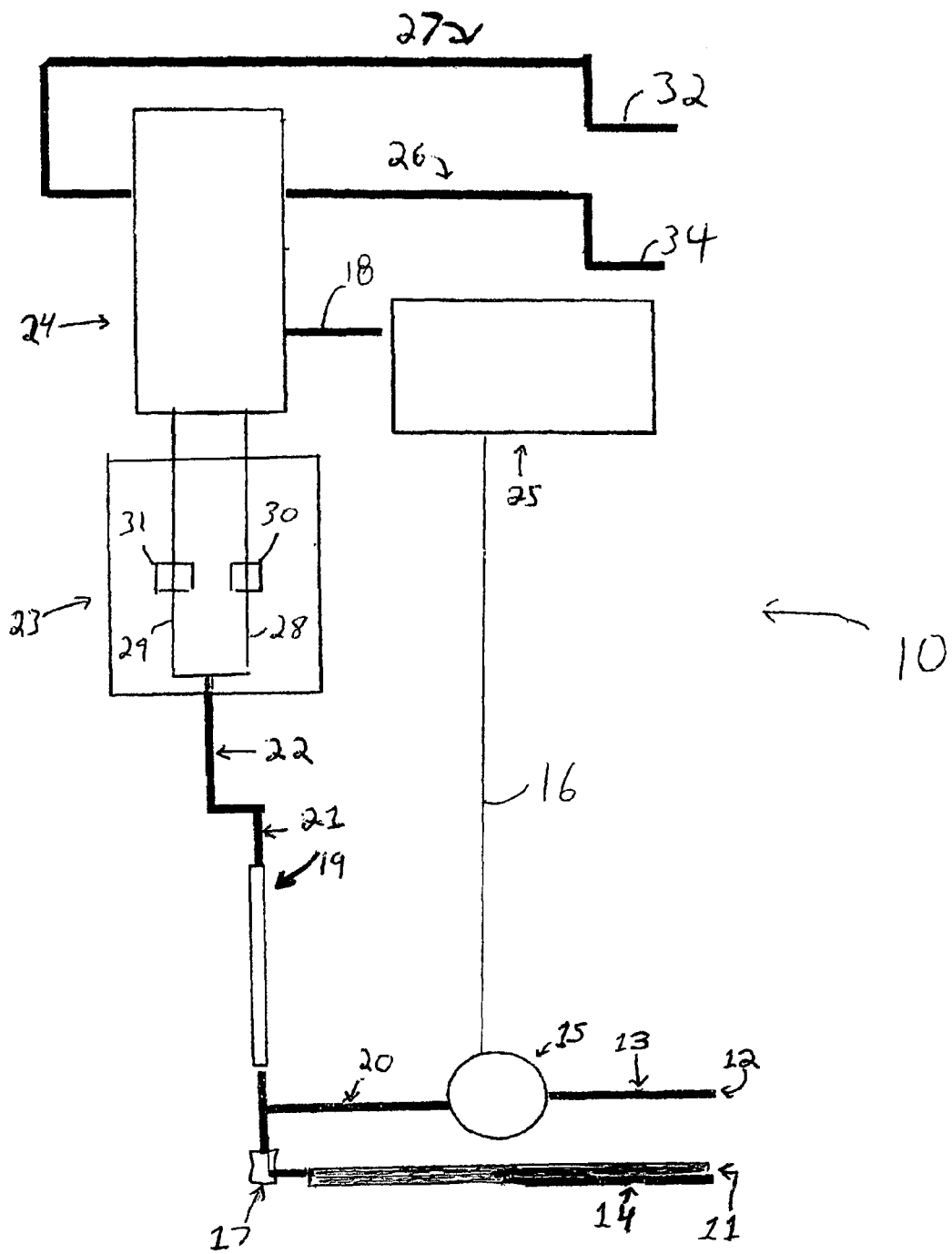
FIG. 1 is a diagram of the apparatus of the invention.

The apparatus of the present invention produces a positively charged anolyte solution. As used herein, the term anolyte solution refers to the solution disclosed and produced by the apparatus of the present invention. The anolyte solution is generated by passing a saline solution (salt and water) over membranes that are electrified. Materials for production are economic and readily available and naturally reverts to salt and water. The anolyte solution is environmentally friendly to produce and use, safe to handle, and has a broad spectrum of biocidal activity including; bacteria, virus, mold and microbial spores.

The anolyte solution is an effective high-level disinfectant that is used at ambient temperatures to 1) control or reduce emerging and drug resistant pathogens,
2) help prevent numerous food and waterborne infectious disease outbreaks, and 3) replace/reduce the use of costly disinfectants in the treatment of pathogens and spoilage microorganisms in agriculture, animal operations, aqua-culture, healthcare, food production, mold eradication, hospitality industries, and a variety of other applications.

The anolyte solution is a powerful disinfecting cocktail including ozone, oxygen, hydrogen peroxide, hypochlorous acid, chlorine dioxide, chlorine gas, and hydrochloric acid. Using only salt and water, the anolyte solution is generated by passing a saline solution over membranes which are electrified by titanium-coated electrodes. The product generated has a pH of 1.0-2.5 and an oxidation reduction potential of >1100 mV.

The redox potential of the reactive molecules produced in the chamber of the electrodialysis (ED) cell and the synergistic antimicrobial properties of the oxidizing species in the anolyte solution, results in a product with a bacterial efficacy far greater than of any individual components used alone. The concept of electrolyzing saline to create a disinfectant is appealing because the basic materials salt, water, and electricity, are economic and readily available. The end product is non-toxic, requires no special storage or disposal and does not add to mechanisms of antimicrobial resistance.

Electrodialysis membrane processes generally treat electrolyte solutions between electrodes separated by ion exchange membranes to an electron flow. In these processes, the membranes simultaneously fulfill different functions as separators of the electrodes and as selective separators of electrolyte solutions allowing some ions to pass and block others according to their charge and size. The selectivity of ion exchange membranes results in a variety of different processes. These processes are designed for a concentration and/or dilution of a solution or a purification and/or isolation of a product from a mixture (removing of salt from a saline solution), a chemical reaction of salts, facilitating the production of new material including hydroxide and protons or other electrode reaction products. Electrodialysis allows desalination and concentration of salt solutions. Membrane electrolysis involves use of electrode reactions as a source of hydrogen ions and hydroxide ions with the selectivity of ion exchange membranes to split neutral salts into their corresponding acids and bases. It is these acids which have great bacterial efficacy. Electrodialysis with bipolar membranes involves the splitting of neutral salts into their corresponding acids and bases using bipolar membranes as a source of protons and hydroxide ions. The bases like Hydroxide are found in a resultant catalyte solution.

The liquid products generically known as "Anolyte" and "Catholyte" are generated by using electricity to chemically disassociate a sodium chloride water solution. This process is achieved utilizing a membrane hardware system formed into a "reaction cell" also referred to as an "electrodialysis cell".

This hardware includes; selectively permeable membranes, a polymer based housing, inert spacers and electrodes. There are two membrane types utilized which are arranged in an alternating "stacked" pattern. One of the membranes is selective to allowing only positively charged ions and molecules to cross, while the other membrane is selective to allowing only negatively charged ions and molecules to cross. Electric current will flow freely through the membranes and any electrically conductive solution they are submerged in. As electricity is applied to the stacked membranes the solution reacts to the flow of electrons. The passing, accepting and donating of electrons between the molecules which comprise the liquid constitute the chemistry of the reaction. In this chemistry of the reaction a rearrangement of the molecules which comprise the liquid occur in a way which favors stability of those molecules in the electrochemical microenvironment established in the reaction chamber. As these chemical species are formed they will attain an electrical charge depending on whether the atoms and molecules have accepted or donated electrons. Due to the high content of electrons introduced to the solution as an applied current, the molecules and atoms will take on an electrical charge in the reaction chamber. As charged species of their respective molecules are formed they will migrate to the electrodes of opposite charge. During this migration these charged species will be separated by the selectivity of the membranes. The membranes are arranged in an alternating sequence which creates "chambers" where a concentration of the charged species is collected. The collected charged species now constitute a cocktail of chemical compounds which are then routed to collection chambers which are ultimately discharged from the reaction cell into collection lines.

Two fluid input ports are located recessed on each side of the unit encasement. To the left port pressurized fresh water line is connected. To the right port is connected a line supplying a fully saturated sodium chloride and water solution. The fresh water will flow into the machine when a solenoid activated valve is opened. The fresh water will pass through a pressure regulator and proceed to a tee juncture. The sodium chloride fluid mixture enters the machine when drawn in by a peristaltic pump installed inside the unit encasement. The sodium chloride fluid mixture exits the pump and proceeds to the tee juncture.

The tee juncture joins the pressure regulated fresh water and the sodium chloride fluid mixture from the pump. The two fluids are mixed by an in line mixing apparatus. The mixed sodium chloride solution is evenly split into two separate lines, using a tee junction. One line from the tee junction will go to a left side flow regulator, which will lead into the lower left side "Anolyte" chamber of the electrodialysis cell. The other line will go to a right side flow regulator, which will lead into the lower right side "Catholyte" chamber of the cell. The catholyte discharge line has a vent to allow the escape of hydrogen gas produced. The fluids will exit the top of the cell and will exit the machine through recessed ports located on the respective sides of the unit encasement.

The electrodialysis cell having fluid flow as described is connected to a power supply of sufficient amperage. The power supply provides a 24 volt direct current to the cell and the printed circuit board. The printed circuit board will regulate the saline fluid pump. The printed circuit board will regulate the saline fluid pump by regulating the 24 Volt D/C power supplied to it. The circuit board is constructed and arranged to function using novel programming to read the current flowing across the cell via a shunt or hall effect apparatus. This reading is used by the circuit board to calculate and adjust the speed of the saline pump. The speed of the saline pump will determine the amount of saline mixing with the fresh water and then entering the cell. The amount of saline entering the cell determines the amount of current which crosses the cell. The circuit board will stop the current if too much saline and therefore too much current enters the cell. The circuit board will stop the current if too little saline and therefore not enough current enters the cell. Too low saline concentration will result in a voltage drop which may result in internal burning. The "run" cycle is stopped by the circuit board by stopping the power to the cell. The circuit board will then also stop the saline pump as part of the stop function. With the saline pump stopped the fresh water valve remains on allowing fresh water to "flush" the cell for a predetermined time. Once the flush is complete the machine will turn the fresh water valve off and revert to a "stand by" status. The operator may restart the "run" cycle from the stand by mode. The "stand by" mode is the machine's electronics default start mode.

The software programming for the hardware circuit board is proprietary and is specifically written for this application. The operator functions include a "prime" cycle a "stand by/ready" mode and a "run" cycle. The prime function is used to run the saline pump by itself in order to draw up a sodium chloride solution from a vessel containing a prepared sodium chloride solution. The run function allows the machine to produce the anolyte and catholyte solutions.

The anolyte has a final mixture of Chlorites that includes $HClO$, $HClO_2$, $HClO_3$, $HClO_4$ and chlorine gas totaling approximately 0.050%. Hydrogen peroxide totaling approximately 0.00005%. and ozone totaling approximately 0.008% with the remainder of the solution being water and trace oxidative components.

The microbial efficacy of the combined anolyte components is that of oxidizing cell membrane proteins thereby inactivating "spores" and disrupting cell membrane function of organisms.

The catholyte has a final mixture totaling approximately 0.8% hydrogen peroxide, approximately 0.9% sodium hydroxide and 4.5% sodium chloride, with the remainder being water and trace reducing agents.

The apparatus has separate circuits for each hardware component in the that allows a microprocessor computer controller 15 to monitor and respond to the various components in the apparatus. Each circuit has specialized software programming for the hardware component it regulates.

The apparatus configuration is depicted generally in FIG. 1 input device/valve for fresh water 11 and input device/valve for salt 12. Salt travels through tube 13 to NaCl pump 15. Circuitry 16 from microprocessor computer controller 25 controls NaCl pump 15. Circuitry 16 from microprocessor computer controller 25 contains specialized software programming that regulates NaCl pump 15, takes readings of the electric current in reaction cell 24 through circuitry 18, and converts that information into a speed setting for NaCl pump 15. Fresh water flows through first tube 14, leading to pressure regulator 17 that regulates pressure in fresh water line 14 and subsequently combines fresh water from line 14 with salt from third tube 20 into mixer 19. The salt is discharged from NaCl pump 15, flows through third tube 20 and enters mixer 19. In mixer 19, the purified water and salt are mixed. After the water and salt are thoroughly mixed, the salt water solution travels through fourth tube 21 into fifth tube 22. The hypotonic salt water solution is split into two lines, first flow regulated line 28 and second flow regulated line 29 that lead to two separate flow regulators 30 and 31 respectively on flow regulator board 23. There is approximately a ratio 1:3 between the flow settings. The function of flow regulator board 23 is to provide a flow of salt water solution to each side of reaction cell 24 at a set volume per unit time. Each of first flow regulated line 28 and second flow regulated line 29 corresponds to cathode and anode chambers formed by the arrangement of the electrically selectively permeable membranes. The difference in their flows is due to the disproportionate creation of products and for heating dissipation. The ratio 1:3 between cathode and anode chambers favors production of the more effective Anode product. The ratio can be adjusted depending on heat of the reaction. Reaction cell 24 is the site of production of the active ingredients that constitute the solution of the present invention.

Reaction cell 24 is controlled and regulated by microprocessor computer controller 25. Circuitry in microprocessor computer controller 25 provides a very strict control of the D/C current supplied to reaction cell 24. The computer controller adjusts the salt (NaCl) mixture added to the fresh water input. The circuitry 18 from microprocessor 25 monitors the electric current across reaction cell 24 and adjusts NaCl pump 15 in an inverse relationship. The complexity of this monitoring and adjustment is carried out according to the software in the system. The reactions within cell 24 are complex electrolytic reactions with electromagnetic influences. There is no control of the reaction process in reaction cell 24; the only control is by microprocessor 25 of the reactants entering the process, salt, water, and electricity. The monitoring is achieved using electronic components that no other system of its type uses. A current shunt is used to gauge the actual current crossing reaction cell 24. A signal gain amplifier and a current shunt amplifier are part of the computer. Later models may use a "hall effect" current sensor, use of which is unique to your system. Either the conventional current shunt or the Hall Effect sensor are independently located; optimally placed proximal to reaction cell 24. The salt solution, provided at full concentration (36%), is drawn into the machine by either an optional pump or by the pressure from municipal water supply entering at valve 11. The salt solution is then mixed with the fresh water at a ratio determined by the software of the circuit board.

The circuit board is unique in that its components are arranged with specialized software into an integrated system. This allows for the construction of smaller units of the Apparatus. The software programming is specific to the board and not commercially available and therefore unique and is attached here to. Other machines use circuit boards with pre-programmable logic control that have limitations. The Apparatus system is more precise when compared to any other comparable system. The circuit board monitors all activity in the Apparatus. It detects a blockage in output lines, for example, that would damage reaction cell 14 and adjusts accordingly.

Conventionally available models typically do not operate higher than 22 Amps. This is due to the conventionally available model's pre-programmable logic control's limitations. The logic controls can not control a fluctuation. The logic boards of conventionally available machines are limited to $^{+/-}7$ Amps. Electrical currents greater then 30 Amps would destroy the membranes in reaction cells of current models. An amp, or amperes, is defined as the current or amount of electrical energy flowing through a device at a given time. Amperage must be controlled or limited to protect the electrical lines from overheating or short-circuiting. The integrated circuit board of the Apparatus provides more control in Amperage. The integrated circuit board of the Apparatus, unlike conventionally available models, allows for a fluctuation of $^{+/-}2$ Amps, thereby permitting an electrical current of 28 Amps. Thus, the Apparatus keeps electrical current below the 30 amperage threshold and also allows for an elevated setting over conventionally available systems. This control is achieved through control of the concentration of $Na^+$. The integrated circuit board of the Apparatus can handle expansion and an increase in Amps. Future expansion will enable better quality control by having multiple expansion options including, but not limited to, p[H] and ORP sensors. The newer models may also feature built-in remote computer access to the on-board computer.

As production continues, product 1 flows from reaction cell 24 through output hose 27 and is discharged through product output 32. Product 2 flows from reaction cell 24 through output hose 26 and is discharged through product 2 output 34. One product contains the negatively charged products; the other contains the positively charged products. The positively charged product is the one of interest due to its microbiological efficacy. The negatively charged product is disposed of. Said negatively charged product has low concentration of sodium hydroxide and can be used as a cleaner.

Figure 2:
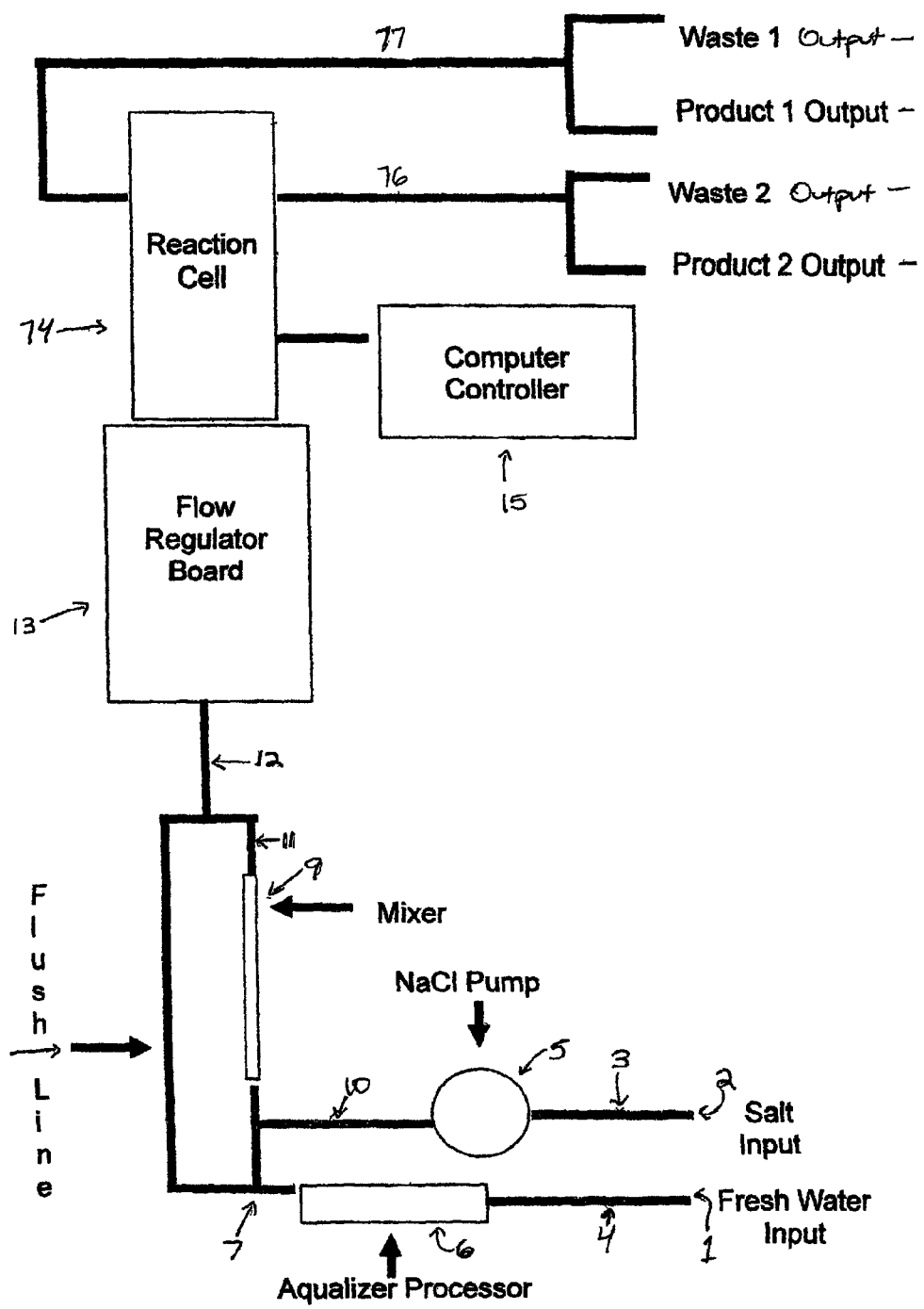
FIG. 2 illustrates the mechanism of the Apparatus.

As production continues, referring to FIG. 2, two products are created or electrochemically synthesized. Product 1 flows from reaction cell 74 through port 77 and is discharged through Product 1 Output. Product 2 flows from reaction cell 74 through port 76 and is discharged through Product 2 Output. One product contains the negatively charged products; the other contains the positively charged products. The positively charged product is the one of interest due to its microbiological efficacy. The negatively charged product is disposed of. Said negatively charged product has low concentration of sodium hydroxide and can be used as a cleaner. The waste by-product 1 flows from reaction cell 74 through port 77 and is discharged through Waste 1 Output.

Waste 2 flows from reaction cell 74 through port 76 and is discharged through Waste 2 Output.

The waste is in reference to fluids produced prior to acceptable current readings across the reaction cell 74. Waste considerations have been eliminated as the second generation prototype system ramps up to operating parameters with negligible waste due to a modification to the circuit board, thus enabling greater efficiency.

There is a safety shutdown if the current readings exceed reaction cell tolerances. A safety shutdown also occurs if the current is too low for a prolonged period of time.

Lab Testing

The reduction of *E. Coli* (ATCC 15597) and *S. aureus* (ATCC 12600) by the disinfectant solution at various time points following the introduction of the bacteria.

Methodology

The reduction of *E. Coli* (ATCC 15597) and *Staphylococcus aureus* (ATCC 12600) by the disinfectant solution at various time points following the introduction of the bacteria. *Staphylococcus aureus* (ATCC 12600) and *E. Coli* (ATCC 15597) stock cultures were obtained from American Type Culture Collection and are maintained at −80 C for Challenge experiments, overnight cultures from the frozen stocks were grown in 10 ml of Tryptic Soy Broth (TBS, Beckton Dickinson, MD) at 36 C prior to the date of the experiments. At the day of the Challenge, the broth cultures were centrifuged at 3K×G for 5 minutes and suspended in 10 ml of phosphate buffered saline (PBS, Fisher Scientific, PA).

Twenty ml of PBS and 20 ml of the disinfectant solution specimen delivered, was placed in 50 ml conical bottom polypropylene tubes (Fisher Scientific, PA). To each of the tubes approximately $2.3 \times 10_6$ of *Staphylococcus aureus* was added and the tubes were agitated rapidly. At 10, 30, 60, and 180 seconds following the addition of the bacteria 1 ml aliquots of PBS and disinfectant solution were removed and placed in 9 ml of PBS containing 0.02% sodium thiosulfate. The microorganisms in each of the dilution tubes were enumerated by spread plating onto Plate Count Agar (PCA, Beckton Dickinson, MD) and incubation at 37 C for 24 hours. The same experiment was repeated using *E. coli*. Tables 2 and 3 contain the results of the above mentioned tests.

TABLE 2

The reduction of *E. Coli* (ATCC 15597) by the anolyte disinfectant solution at various time points following the introduction of the bacteria

| | Colony Forming Units (CFU/m)l of the *E. Coli* at the below time points | | | | |
|---|---|---|---|---|---|
| Sample | 10 sec. | 30 sec. | 60 sec. | 3 min. | 5 min. |
| PBS (control) | $3.2 \times 10^5$ | $5.8 \times 10^5$ | $4.7 \times 10^5$ | $2.2 \times 10^5$ | $2.5 \times 10^5$ |
| Disinfectant Solution | <10 | <10 | <10 | <10 | <10 |

TABLE 3

The reduction of *S. aureus* (ATCC 12600) by the anolyte disinfectant solution at various time points following the introduction of the bacteria

| | Colony Forming Units (CFU/ml) of the *S. aureus* at the below time points | | | | |
|---|---|---|---|---|---|
| Sample | 10 sec. | 30 sec. | 60 sec. | 3 min. | 5 min. |
| PBS (control) | $1.8 \times 10^5$ | $9.7 \times 10^5$ | $1.1 \times 10^5$ | $1.0 \times 10^5$ | $1.6 \times 10^5$ |
| Disinfectant Solution | <10 | <10 | <10 | <10 | <10 |

An independent laboratory analysis conducted as per AOAC (Association of Official Agricultural Chemists), ASTM (American Society for Testing and Materials), and standard methods and protocols indicate a 99.9999% (6 log 10) reduction of the following:

Bacterial Species:
  *Staphylococcus aureus, E. coli, Pseudomonas aeruginosa, Listeria monocytogenes*, and *Samonella choleraesuis* (Table 4)

Fungal Species:
  *Trichophyton mentagrophyte* and *stachybotrys chartarum* (Table 4)

AOAC Official Method 961.02 Germicidal Spray Products as Disinfectants (2005)

*Staphylococcus aureus* (ATCC 6538), *E. coli* O157:H7 (ATCC 43895) *Pseudomonas aeruginosa* (ATCC 15442), *Listeria monocytogenes* (ATCC 4428), *Salmonella choleraesuis* (ATCC 10708), *Tricophyton mentagrophytes* (ATCC 9533) and *Stachybotrys chartarum* (ATCC 9182) stock cultures were obtained from American Type Culture Collection and were maintained as per the described methodology and in AOAC 961.02 and the referenced related AOAC protocols. For Challenge experiments, cultures were grown at the temperature and incubation times specified in the specified method. *E. coli* O157:H7 and *Listeria monocytogenes* were grown as per method 991.47. Fungal spores of *Tricophyton mentagrophytes* and *Stachybotrys chartarum* were grown and harvested as outlined in Method 955.17. All media used for microbial growth were manufactured by Beckton Dickinson (Sparks, Md.) and were purchased from ThermoFisher Scientific (Waltham, Mass.). All media used was new and was purchased specifically for the project. Positive and negative controls were performed as outlined in the Method.

Nine 1-gallon bottles of the anolyte solution were delivered to the lab. On the same day, one bottle of each of the above was opened for each bacterial species challenge study. The liquid was placed into handheld spray bottles (Fisher Scientific). Cultures of the following bacteria were grown as specified in Method 961.02: *Staphylococcus aureus, E. coli* O157:H7, *Pseudomonas aeruginosa, Listeria monocytogenes*, and *Salmonella choleraesuis*. Ten-microliters of the bacterial suspension was placed and spread onto sterile 25×25 mm glass slides (Fisher Scientific, PA). Ten slides for each bacterial species were used for challenge; additionally, one un-inoculated slide was used as a negative control and one inoculated slide was used as a positive growth control. The inoculum was allowed to dry at 37° C. for 40 minutes. The slides were the sprayed for 10 seconds with the provided solutions; the glass slides were completely covered with solution. The slides were allowed to incubate at room temperature for 10 minutes. The slides were then removed, excess liquid was shaken off, and they were placed into 20 ml of appropriate growth media and allowed to incubate as per method requirements. The tubes were examined for microbial growth at 48 and 72 hour intervals. Sub cultures were also removed and examined for growth as described in the method. Tubes demonstrating no growth following the incubation period were inoculated with 10-100 cfu of the respective microorganisms and were observed for growth after 24 hours; this was done to ensure the absence of residual antimicrobial residual effect. One additional 1-gallon bottle of anolyte solution was delivered to the lab. On the same day, the bottle was opened and the liquid was placed into handheld spray bottles (ThermoFisher Scientific). Spores of *Tricophyton mentagrophytes* and *Stachybotrys chartarum* were harvested earlier that morning as described in AOAC method 955.17. The above mentioned challenge was repeated using the spore inoculate as per AOAC 961.02. All data is summarized in the following table.

TABLE 4

Anolyte Solution Inactivation of Bacterial and Fungal Species Test conducted as per AOAC Official method 961.02

| Micro-organism | Number of Inoculated Glass Slides Sprayed with CIDEOX | Number of Tubes Demonstrating Growth | Positive Control (un-sprayed slide) | Negative Control (un-inoculated slide) |
|---|---|---|---|---|
| *Staphylococcus aureus* | 10 | None | Growth | No-Growth |
| *E. coli* O157:H7 | 10 | None | Growth | No-Growth |
| *Pseudomonas aeruginosa* | 10 | None | Growth | No-Growth |
| *Listeria monocytogenes* | 10 | None | Growth | No-Growth |
| *Salmonella choleraesuis* | 10 | None | Growth | No-Growth |
| *Trichophyton mentagrophyte* | 10 | None | Growth | No-Growth |
| *Stachybotrys chanarum* | 10 | None | Growth | No-Growth |

Results

The disinfectant liquid exhibited excellent antibacterial and antifungal efficacy by passing the above-mentioned test using various microorganisms.

Poliovirus 1 Challenge Study

Methodology

Poliovirus 1 (Strain: chat, ATCC VR-1562) was propagated on Buffalo Green Monkey Cells. Cell free viral stocks are titrated and maintained at −80° C. For Challenge experiments, an aliquot of the virus stocks was thawed rapidly and maintained at 4° C. until use. The viral challenge studies were conducted as per our standard laboratory protocol. Briefly: 20 ml of Sterile Type 1 ASTM grade water (Rica Chemical Co., TX) and 20 ml of the various dilutions of analyte solutions were placed in sterile 50 ml conical bottom polypropylene tubes (Fisher scientific, PA). The analyte disinfectant was generated on site by the apparatus unit. The disinfectant was generated immediately prior to the challenge and dilutions of the disinfectant were prepared in ASTM type 1 deionized water. To each of the water or disinfectant challenge tubes, approximately 1.0×106 of the above Poliovirus was added. The tubes were then inverted repeatedly at a moderated-slow speed for 60 seconds. Following the exposure, a 0.1 ml aliquots of solution was removed and placed in 10 of Neutralizing Broth (Beckton Dickinson, MD) supplemented w/5% Fetal Bovine serum (Atlanta Biologicals, GA). The viruses in the tubes were then enumerated on buffalo Green Monkey Cells as plaque forming units (pfu) by an agar overlay assay as per standard methods. Various volumes and dilutions were inoculated onto the cell monolayers in T-25 cell culture flasks (Corning N.Y.).

The flasks incubated at 37° C. for 72 hours and plaques were enumerated. All analyses were conducted in duplicates and experiments were repeated to verify results. The following table contains the results of the above-mentioned test.

TABLE 5

POLIO VIRUS 1 CHALLENGE
The reduction of Poliovirus 1 (CHAT, ATCC VR.1562) by the various dilutions of the Anolyte disinfectant solution generated on site by the apparatus of the present invention.

| Sample | Poliovirus 1 pfu/ml in the dilution buffer | Percent reduction |
|---|---|---|
| ASTM water | $5.0 \times 10^3$ | NA |
| 5% Anolyte Solution | $1.8 \times 10^3$ | 64% |
| 10% Anolyte Solution | <1.0 | >99.9% |
| 20% Anolyte Solution | <1.0 | >99.9% |
| 50% Anolyte Solution | <1.0 | >99.9% |

Results

Challenge testing was conducted to evaluate the antiviral efficacy of the disinfectant. Various dilutions of the disinfectant were evaluated. The disinfectant exhibited excellent antiviral efficacy in the challenge test devised.

*Bacillus subtilis* Challenge Study
Methodology

*Bacillus subtilis* (ATCC 19659) was propagated on Plate Count Agar and Tryptic Soy Broth (Beckton Dickinson, MD). The original ATCC strain is maintained at −80° C. A purified spore suspension of *B. subtilis* was produced as per ASTM E2111-00 (Standard Quantitative Carrier Test Method To Evaluate the Bactericidal, Fungicidal, Mycobactericidal and Sporicidal Potencies of Liquid Chemical Germicides). Spores were generated 48 hours prior to challenge.

The spore challenge studies were conducted as per our standard laboratory protocol. Briefly: 20 ml of Sterile Type 1 ASTM grade water (Rica Chemical Co., TX) and 20 ml of the various dilutions of anolyte solutions of the present invention were placed in sterile 50 ml conical bottom polypropylene tubes (Fisher scientific, PA). The anolyte solutions of the present invention disinfectant was generated on site by apparatus of the present invention. The disinfectant was generated immediately prior to the challenge and dilutions of the disinfectant were prepared in ASTM type I deionized water. To each of the water or disinfectant challenge tubes, approximately $1.0 \times 10^6$ of the above purified spore suspension was added. The tubes were then inverted repeatedly at a moderated-slow speed for 60 seconds. Following the exposure, a 100 µl aliquots of solution was removed and placed in 10 of Neutralizing Broth (Beckton Dickinson, MD). The spores in the dilution tubes were then enumerated by spread plating onto Plate Count Agar (Beckton Dickinson, MD) as per laboratory standard method. The plates were then incubated at 37° C. for 48 hours and the colonies were enumerated. All analyses were conducted in duplicates and experiments were repeated to verify results. The following table contains the results of the above-mentioned test.

TABLE 6

Anolyte solutions of the present invention Reduction of *Bacillus subtilis* spores (ATCC 19659) Purified spore suspension produced per ASTM E2111-00

| Sample | *B. subtilis* spore concentration cfu/ml in dilution buffer | Percent reduction |
| --- | --- | --- |
| ASTM water | $9.6 \times 10^2$ | NA |
| 20% Anolyte solution | 5.0 | 99.5% |
| 50% Anolyte solution | $10 \times 10^1$ | 98.8% |
| 100% Anolyte solution | <0.1 | >99.98% |

Results

Challenge testing was conducted to evaluate the sporocidal efficacy of the disinfectant. Various dilutions of the disinfectant were evaluated. The disinfectant exhibited excellent sporocidal efficacy in the challenge test devised.

Experiment

Use of Mixed Oxidant (Anolyte solution) to Inactivate *Cryptosporidium* in Aqueous Solution Materials and Methods

*Cryptosporidium* oocysts. Live *Cryptosporidium* oocysts ($2.5 \times 10^5$ oocysts/ml) are obtained from Waterborne, Inc. (New Orleans, La.). Stock oocysts were suspended in Phosphate Buffered Saline (pH 7).

Disinfection Experiments.

An aliquot of 0.25 ml of the *cryptosporidium* stock suspension was added to a sterile 15 mL polypropylene conical centrifuge tubes (Fisher Scientific, USA). To each tube, 5 ml of either Phosphate Buffered saline or 100% freshly produced CIDEOX was added. The tubes were gently rotated horizontally on a Dynalr agitator (ATR Inc, USA) for 1 minute or 5 minutes. The tubes were the removed from the shaker and 5 mL of neutralizing Buffer (Beckton Dickinson, USA) was added to each tube. The above experiment was conducted in duplicates (A and B). The oocysts in the tubes were then concentrated by immuno-magnetic separation as per EPA 1623 methodology. Concentrates were analyzed for viability by the mammalian tissue cell culture assay below using human ileocecaladenocarcinoma cells (HCT-8).

Tissue Culture Infectivity Assay.

Aliquotes *Cryptosporidium* oocysts were inoculated onto HCT-8 cell monolayers in 8-well chamber glass cell culture slides and incubated in a 5% CO2 atmosphere at 37° C. for 48 hours. Viable *Cryptosporidium* were enumerated by the Foci Detection-Most Probable Number Method (Slifko et al., 1999). Briefly, cell monolayers were fixed and stained with fluorescent-labeled antibody specific for the reproductive stages of the *Cryptosporidium* lifecycle (specifically sporozoites). Infectious foci were observed by UV epifluoroescence microscopy. Individual wells were scored as positive or negative for infection and results are calculated using a most probable number (MPN) statistical analysis. Results are reported as MPN of viable oocysts per milliliter (Tables 7 and 8).

TABLE 7

Most Probable Number of Viable *Cryptosporidium* Before and After Treatment with Anolyte solution Mixed Oxidant Solution.

| Sample ID | Starting Quantity (PBS Control) | One min. Treatment (MPN) | One min. $\log_{10}$ Reduction | Five min. Treatment (MPN) | Five min. $\log_{10}$ Reduction |
| --- | --- | --- | --- | --- | --- |
| A | >$1.4 \times 10^4$ | $1.4 \times 10^3$ | >1.00 | $1.5 \times 10^2$ | >1.97 |
| B | >$1.4 \times 10^4$ | $6.9 \times 10^2$ | >1.31 | $6.9 \times 10^2$ | >1.31 |

TABLE 8

Most Probable Number of *Cryptosporidium* Before and After Treatment With Anolyte solution Mixed Oxidant Solution.

| Sample ID | Starting Quantity (PBS Control) | One min. Treatment (MPN) | One min. $\log_{10}$ Reduction | Five min. Treatment (MPN) | Five min. $\log_{10}$ Reduction |
| --- | --- | --- | --- | --- | --- |
| A | $2.9 \times 10^4$ | $1.2 \times 10^3$ | 1.38 | $1.4 \times 10^2$ | 2.31 |
| B | $2.9 \times 10^4$ | $2.8 \times 10^3$ | 1.01 | $1.4 \times 10^2$ | 2.31 |

RESULTS The efficacy of the disinfectant solution on the inactivation of *Cryptosporidium* oocysts. Infectivity assays were conducted using human ileocecaladenocarcinoma cells and oocysts specific immuno-fluorescent staining. According to the protocol utilized the disinfectant solution demonstrated a remarkable efficacy of inactivating viable *cryptosporidium* oocysts.

Log Reductions.

The reductions (>99% inactivation) of viable oocysts observed within the limited contact time of 1-5 minutes initially appears to be equally or more effective than the disinfection contact times reported in the literature using oxidizing disinfectants such as chlorine dioxide and ozone. In two published reports, exposure to 1 mg/L ozone for 5 min (maintained constant throughout) or 1.3 mg/L chlorine dioxide (initial concentration) for 60 min, achieved >90% inactivation, whereas 90 min exposure to 80 mg/L (initial concentration) of either chlorine or monochloramine was required for the same degree of inactivation (Korich, Mead, Madore, Sinclair, & Sterling, 1990; Peeters, Ares Mazás, Masschelein, Villacorta-Martinez de Maturana, & Debacker, 1989). The data allowed approximate CT values of between 5 and 10 for ozone, 78 for chlorine dioxide, and 7200 for chlorine and monochloramine to be estimated, for 99% inactivation at 25°C in buffered (pH 7.0) demand-free water (Finch, Black, Gyürek, & Belosevic, 1993).

Experiment

*Staphylococcus aureus* and *E. coli* Challenge

*Staphylococcus aureus* (ATCC 12600) and *E. coli* (ATCC 15597) stock cultures were obtained from American Type Culture Collection and are maintained at −80° C. For Challenge experiments, overnight cultures from the frozen stocks were grown in 10 ml of (Tryptic Soy Broth (TSB, Beckton Dickinson, MD) at 36° C. prior to the date of the experiments. At the Day of Challenge, the broth cultures were centrifuged at 3K×G for 5 minutes and suspended in 10 ml of phosphate buffered saline (PBS, Fisher Scientific, PA)

The lab received delivery of a sealed 1-gallon dark container that was filled completely with Anolyte solution of the present invention. The lab was advised that the Anolyte solution was produced and collected one month prior to delivery. The liquid had been stored in the air tight dark container since collection. The bottle was opened the day of delivery to inspect the contents briefly then it was sealed again. The day following delivery, the following experiment was conducted:

Twenty ml of PBS and 20 ml of the delivered anolyte solution were placed in 50 ml conical bottom polypropylene tubes (Fisher Scientific, PA). This was done in triplicates To each of the tubes approximately $1.3 \times 10^6$ of *Staphylococcus aureus* was added and the tubes were agitated rapidly. At 10, 30, 60, and 180 seconds following the addition of the bacteria 1 ml aliquots of PBS and disinfectant solution were removed and placed in 9 ml of PBS containing 0.02% sodium thiosulfate. The microorganisms in each of the dilution tubes were enumerated by spread plating onto Plate Count Agar (PCA, Beckton Dickinson, MD) and incubation at 37° C. for 24 hours. All analysis was conducted in triplicate (Table 9). The same Experiment was repeated using *E. coli* (Table 10).

TABLE 9

The reduction of *S. aureus* (ATCC 12600) by the 1 month old Anolyte solution at various time points following the introduction of the bacteria.

| Sample | Colony Forming Units (CFU)/ml of the *S. aureus* at the indicated time points | | | |
| --- | --- | --- | --- | --- |
| | 30 Sec. | 60 Sec. | 3 Min. | 5 Min. |
| PBS (control) | $6.6 \times 10^4$ | $7.4 \times 10^4$ | $8.2 \times 10^4$ | $9.3 \times 10^4$ |
| Anolyte solution Disinfectant | <10 | <10 | <10 | <10 |

TABLE 10

The reduction of *E. coli* (ATCC 15597) by the 1 month old Anolyte solution at various time points following the introduction of the bacteria.

| Sample | Colony Forming Units (CFU)/ml of the *E. coli* at the indicated time points | | | |
| --- | --- | --- | --- | --- |
| | 30 Sec. | 60 Sec. | 3 Min. | 5 Min. |
| PBS (control) | $2.1 \times 10^5$ | $1.9 \times 10^5$ | $2.9 \times 10^5$ | $3.2 \times 10^5$ |
| Anolyte solution Disinfectant | <10 | <10 | <10 | <10 |

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

I claim:

1. An apparatus for producing an anolyte solution comprising:
   a. a fresh water inlet line and a salt inlet line from a supply of salt solution;
   b. a variable speed salt pump for drawing said salt solution into said salt inlet line;
   c. a mixer for combining said fresh water and said salt solution into a thoroughly mixed salt solution;
   d. two flow lines separating said mixed salt solution, each of said flow lines having adjustable flow regulators;
   e. a reaction cell-having first and second semipermeable membranes said first membrane for allowing only positive charge ions and molecules to cross said first membrane and said second membrane for allowing only negatively charged ions and molecules to cross said second membrane;
   f. a computer controller for monitoring electric current across said reaction cell;
   g. wherein the speed of said salt pump is adjusted based on said electric current measured across said reaction cell to control the quantity of said salt solution drawn into said salt input line;
   h. output lines from said reaction cell for collecting and disbursing fluids produced in said reaction cell, said output lines including one or more waste lines for receiving fluids from said reaction cell, each having a first end and a second end, said first ends connected to said reaction cell and said second end having a discharge valve;
   i. said computer controller configured for determining if the electric current across said reaction cell is not within acceptable current readings said computer controller configured for opening said discharge valve to discharge any waste anolyte and catolyte solutions through said one or more waste lines upon determination that the electric current across said reaction cell is not within the acceptable current readings.

2. An apparatus for producing an anolyte solution as in claim 1, whereby said fluids produced are positively charged anolyte solutions and negatively charged catolyte solutions.

3. An apparatus for producing an anolyte solution as in claim 1, wherein said flow regulators are independent of one another and said flow regulators regulate the flow in said lines to have a 1 catolyte to 3 anolyte.

4. An apparatus for producing an anolyte solution as in claim 1 wherein the supply of said salt solution is fully saturated at ambient temperature.

5. An apparatus for producing an anolyte solution as in claim 4 wherein the ratio of salt to water is 36% NaCl.

6. An apparatus for producing an anolyte solution as in claim 1 wherein the electric current across said reaction cell is monitored with a current shunt.

7. An apparatus for producing an anolyte solution as in claim 1 whereby said flow regulators control flow rates of said salt solution through said two flow lines to control the temperature of said reaction cell.

8. An apparatus for producing an anolyte solution as in claim 1 wherein said semipermeable membranes are in alternating stacked patterns.

9. An apparatus for producing an anolyte solution comprising:
   a. a fresh water inlet line and a salt inlet line from a supply of salt solution;
   b. a variable speed salt pump for drawing said salt solution into said salt inlet line;
   c. a mixer for combining said fresh water and said salt solution into a thoroughly mixed salt solution;
   d. a plurality of flow lines separating said salt solution, each of said flow lines having adjustable flow regulators;
   e. a reaction cell having first and second semipermeable membranes said first membrane for allowing only positive charge ions and molecules to cross said first membrane and said second membrane for allowing only negatively charged ions and molecules to cross said second membrane;
   f. a computer controller for monitoring electrical conditions of said reaction cell;
   g. wherein the speed of said saline pump is adjusted based on said electrical conditions of said reaction cell to control the quantity of said salt solution drawn into said salt input line;
   h. output lines from said reaction cell for collecting and disbursing fluids produced in said reaction cell, said output lines including
   one or more waste lines for receiving fluids from said reaction cell, each having a first end and a second end, said first ends connected to said reaction cell and said second ends having a discharge valve;
   j. said computer controller configured for determining if the electric current across said reaction cell is not within acceptable current readings said computer controller configured for opening said discharge valve to discharge any waste anolyte and catolyte solutions through said one or more waste lines upon determination that the electric current across said reaction cell is not within the acceptable current readings.

* * * * *